Jan. 6, 1948.　　　　A. C. BABKA　　　　2,433,976
CUTTING TOOL
Filed July 9, 1946　　　　2 Sheets-Sheet 1

Inventor:
Aldrich C. Babka

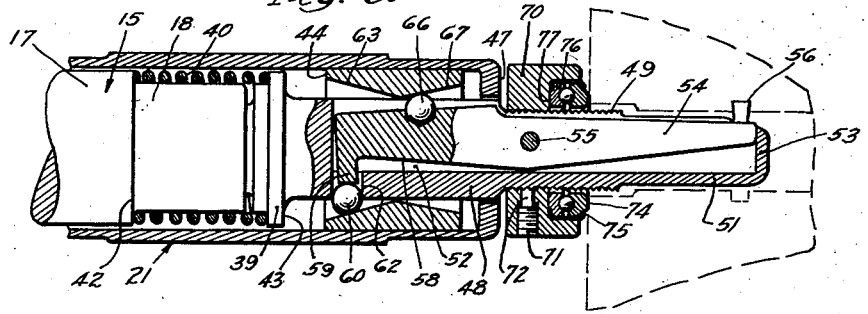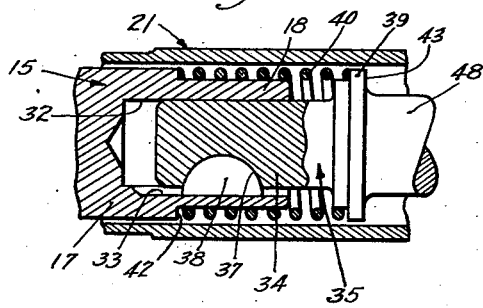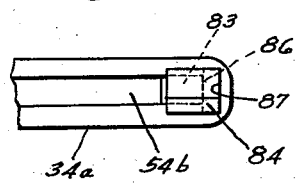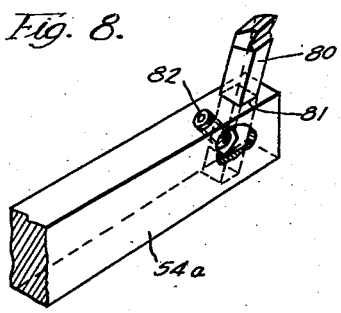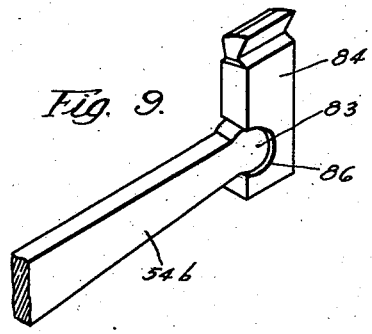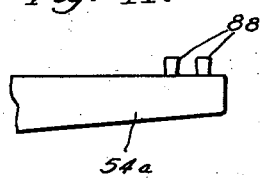

Patented Jan. 6, 1948

2,433,976

UNITED STATES PATENT OFFICE 2,433,976

CUTTING TOOL

Aldrich C. Babka, Cheyenne, Wyo.

Application July 9, 1946, Serial No. 682,337

1 Claim. (Cl. 77—58)

The present invention is concerned with cutting tools and pertains, more particularly, to cutting tools for metal and other materials used for internal cutting or undercutting.

One of the objects of this invention is to provide a simple, sturdy cutting tool in which the cutting or undercutting in radial direction of the work piece is accomplished by moving the tool longitudinally of the workpiece, thereby eliminating the necessity of moving the tool held in the tool support transversely of the workpiece and making the tool of this invention especially suitable for use in turret lathes, radial drill presses and similar machines.

Another object of my invention is to provide a cutting or undercutting tool in which the cutting element is moved radially of the longitudinal axis of the tool by positive displacement of the parts controlling this movement, thereby avoiding any possibility of failure or chattering of the cutting element.

Still another object of the present invention is the provision of a keyed-in line relationship between the cutting element and the mounting shank of the tool, thereby maintaining at all times the cutting element in proper position with respect to the workpiece.

A further object of the present invention is the provision of an adjustable thrust collar adapted to bear against the face of the workpiece.

Still further objects and improvements will appear from the following specification describing the preferred embodiment of my invention and the modifications of the cutting element illustrated in the accompanying drawings, in which—

Figure 6 is a transverse partial sectional view similar to Figure 2 with the parts shown in the cutting position of the tool;

Figure 7 is a fragmentary sectional view taken along line 7—7 of Figure 2;

Figure 8 shows a modified form of cutting element in an isometric view;

Figure 9 shows another modified form of cutting element in an isometric view;

Figure 10 is a plan view of the modification shown in Figure 9; and

Figure 11 shows a multiple point cutting element applicable to the tool of my present invention.

Figure 1:
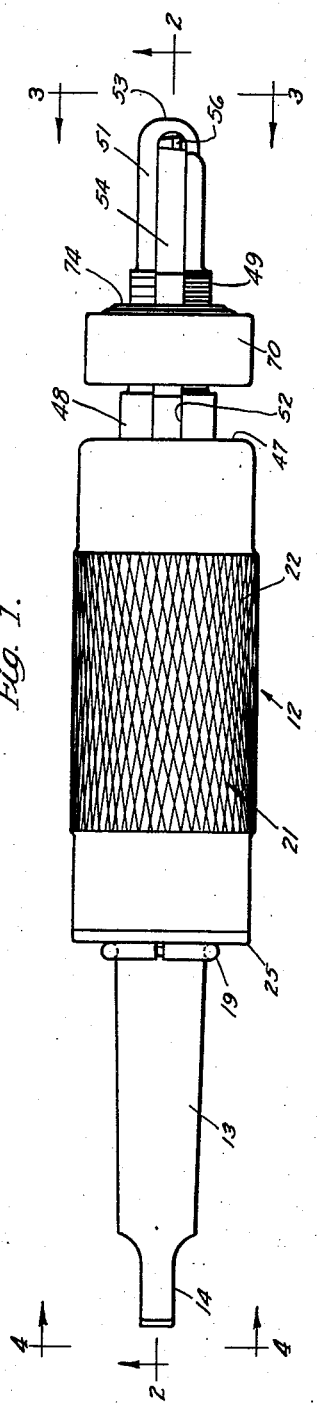
Figure 1 is an elevational view of the preferred embodiment of my invention.
Figure 3:
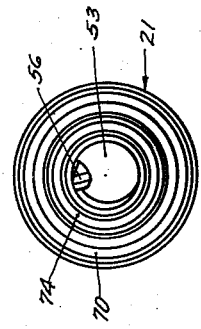
Figure 3 is an end view from the cutting end of the tool as indicated by line 3—3 in Figure 1.
Figure 4:
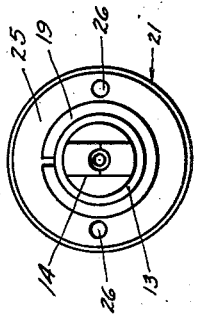
Figure 4 is an end view from the mounting end of the tool as indicated by line 4—4 in Figure 1.
Figure 5:
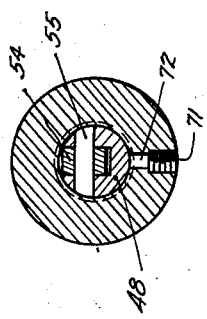
Figure 5 is a transverse sectional view taken along line 5—5 of Figure 2.
Figure 2:
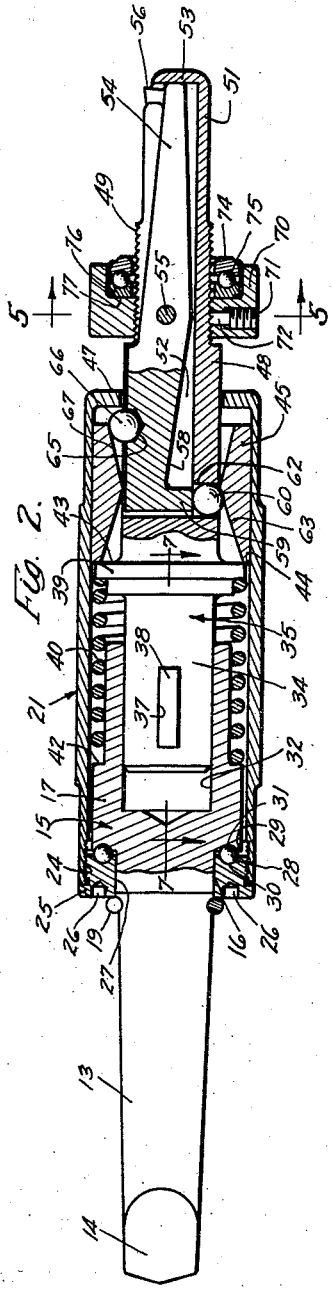
Figure 2 is a longitudinal section thereof taken along line 2—2 of Figure 1.

Referring now in detail to the drawings, Figures 1 to 7, inclusive, the preferred form of embodiment of my invention is indicated, generally, at 12 and comprises a mounting shank 13, preferably formed as a taper shank provided with a tang 14.

The tapered shank 13 is provided with a cylindrical extension 15 which has formed thereon a cylindrical bearing surface 16, an enlarged section 17 and terminates in a cylindrical portion 18 of reduced diameter.

The cylindrical extension 15 is mounted in its entirety within a cylindrical shell housing 21 provided on its outer surface with the knurled portion 22 facilitating the mounting in and demounting of the tool from a tool holder.

The shank 13 and extension 15 are held in their position relative to the shell housing 21 by means of a split lock ring 19.

The shell housing 21 is internally threaded as at 24 for receiving a threaded ring 25 having the spanner wrench holes 26 at its outer face. The ring 25 with its bore 27 has a running fit on the bearing surface 16 of the extension 15 and a thrust ball bearing 28 is interposed between the inward face of the ring 25 and the shoulder 29 of the enlarged section 17 of the extension 15, the races for the balls of the bearing 28 being formed by the grooves 30 and 31 in the ring 25 and the shoulder 29, respectively.

At its inward end, the extension 15 is provided with a concentric bore 32 and a keyway 33, receiving therein in sliding and keyed relation the inward end 34 of the tool bit carrier 35. The inward end 34 is provided with a key seat 37 for receiving a "Woodruff" key 38 engaging in the keyway 33 of the bore 32.

An enlarged cylindrical portion 39 forms an abutment for a spring 40 interposed between the portion 39 and the shoulder 42 of the section 17 of the extension 15. The forward shoulder 43 of the cylindrical portion 39 is pressed in normal position, against the inward end 44 of an internal double cone ring 45 press-fitted in the forward portion of the shell housing 21.

The tool bit carrier 35 projects through the apertured front wall 47 of the shell housing with a cylindrical neck 48. Forward of the neck 48 the tool bit carrier 35 extends in an externally threaded portion 49 of reduced diameter and terminates in a substantially cylindrical nose piece 51.

A longitudinal recess 52 extends from the nose piece 51 inward of its closed end 53 into the neck 48 for snugly receiving the tool bit rocker 54 pivoted upon the pin 55 press fitted into the threaded portion 49.

The tool bit rocker 54 carries at its forward end the tool bit 56, in this embodiment formed integral with the rocker 54, and at its opposite end is cut back as shown at 58, thereby forming a projection 59 riding upon the ball 60 carried with sliding fit in the aperture 62 of the rocker 54.

The ball 60 rides upon the inner cone surface 63 of the double cone 45.

At its opposite face, the rocker 54 is provided with a recess 65 which receives a ball 66, riding on the outer cone surface 67 of the double cone 45. The longitudinal spacing of the balls 60 and 66 corresponds to half the length of the double cone 45, and the inner and outer cones 63 and 67, respectively, are of equal length and predetermined cone angle.

The depth of the recess 65 is gauged so that there is no play between the balls 62 and 66 and the cone surfaces 63 and 67, respectively, on one side and the projection 59 and the bottom of the recess 65, respectively, of the rocker 54 on the other side. This provides for positive movement of the tool bit 56 avoiding any possibility of chattering thereof.

The threaded section 49 of the tool bit carrier 35 receives a threaded thrust collar 70 which is held firmly on the threaded section 49 by means of a set screw 71 pressing a brass plug 72 against the threads. The thrust collar 70 provides for adjustment of the distance of the cut from the face of the workpiece which is engaged by the outer race 74 of the thrust ball bearing 75, the inner race 76 of which is press-fitted into the recess 77 of the thrust collar 70.

The operation of the tool is as follows: With the tool shank 13 firmly inserted in a suitable tool holder and with the tang 14 holding the tool 15 thus locating the tool angularly and the tool carrier held in definite angular relation with the tang 14 by the key 38, the tool holder with the tool 12 is moved into the bore of a workpiece which is to receive an undercut. When the thrust collar 70 hits the face of the workpiece the longitudinal forward movement of the tool carrier 34 is stopped. Continued forward movement of the remaining parts of the tool by the tool carrier will cause the ball 66 to ride up on the outer cone face 67 while ball 60 will recede an equal amount on inner cone face 63, thereby rocking the rocker 54 about the pin 55 and moving the tool bit 56 out of the recess 52 and into cutting position. The depth of the undercut is predetermined by the amount of forward movement of the tool after the thrust collar 70 has come into abutment with the face of the workpiece.

Referring now to Figure 8, the rocker 54a is modified at its front end, the integral tool bit being replaced by an inserted tool bit 80 held in the aperture 81 of the rocker 54a by a set screw 82.

In Figures 9 and 10, the rocker arm 54b is formed at its forward end with knuckle 83 engaging in a recess 86 of a sliding bit 84 corresponding in shape and size substantially to that of the knuckle 83. The tool bit 84 has sliding fit in the recess 87 of the tool bit carrier 34a.

Figure 11 shows a rocker 54a with a plurality of tool bits 88 formed integrally thereon.

While I have shown but one basic embodiment of the tool of my invention and have described it as especially adapted for undercutting operations, it is to be understood that many variations may be made in its construction and the tool may be used for different purposes, such as cutting pipe, especially in boilers, and the like, I do not wish to be limited except by the scope of the following claim.

I claim:

A cutting tool comprising a shank member, a tool carrier, one end of said tool carrier being slidingly mounted within said shank member and held against rotation with respect thereto, the other end of said tool carrier having pivoted within a recess a tool bit rocker with a tool bit integrally formed thereon, a sleeve housing rotatingly mounted at its rearward portion on said shank member and held against longitudinal movement with respect thereto, a double cone rigidly secured in the forward portion of said sleeve housing, the cone surfaces of said double cone sloping in opposite directions at predetermined angles, a set of two balls longitudinally spaced from each other, each of said balls riding the corresponding cone surface on one side and engaging said tool bit rocker on the other side thereof, a compression spring interposed between said shank member and said tool carrier to normally hold said tool bit in retracted position, a thrust collar mounted on said tool carrier for engaging the face of a workpiece and causing said tool bit to be rocked into cutting position by stopping the forward movement of said tool carrier while the shank member, the sleeve housing and the double cone continue in their forward movement against the action of said compression spring.

ALDRICH C. BABKA.

REFERENCES CITED

The following references are of record in the file of this patent:

UNITED STATES PATENTS

| Number | Name | Date |
| --- | --- | --- |
| 524,375 | Blue | Aug. 14, 1894 |
| 1,233,994 | Dow | July 17, 1917 |
| 1,536,208 | Gosper | May 5, 1925 |
| 2,333,935 | Jones | Nov. 9, 1943 |